United States Patent [19]

Hollis

[11] Patent Number: 5,350,092
[45] Date of Patent: Sep. 27, 1994

[54] GARMENT HANGER AND CLIP

[75] Inventor: Joseph C. Hollis, Victoria, Australia

[73] Assignee: Spotless Plastics Pty. Ltd., Victoria, Australia

[21] Appl. No.: 121,966

[22] Filed: Sep. 14, 1993

Related U.S. Application Data

[63] Continuation of Ser. No. 836,150, Feb. 13, 1992, abandoned, which is a continuation of Ser. No. 561,064, Aug. 1, 1990, abandoned.

[30] Foreign Application Priority Data

Aug. 1, 1989 [AU] Australia ............................. PJ5553
Sep. 8, 1989 [AU] Australia ............................. PJ6254

[51] Int. Cl.⁵ .............................................. A47G 25/48
[52] U.S. Cl. ...................................... 223/96; 223/91; 223/85; 24/545; 24/51; 24/489
[58] Field of Search .................. 223/91, 93, 96, 91, 223/88, 85; 24/545, 517, 489; 211/113; D6/326, 315

[56] References Cited

U.S. PATENT DOCUMENTS

| | | | |
|---|---|---|---|
| 3,405,429 | 10/1968 | Vazquez | 223/96 |
| 3,406,883 | 10/1968 | Crane | 223/96 |
| 3,463,369 | 8/1969 | Moskowitz | 223/91 |
| 3,665,563 | 5/1972 | Batts | 24/258 |
| 3,680,746 | 8/1972 | Seckelmann | 223/88 |
| 3,698,043 | 10/1972 | Batts | 24/84 |
| 3,698,607 | 10/1972 | Batts | 223/96 |
| 3,745,616 | 7/1973 | Batts | 223/96 |
| 3,896,527 | 7/1975 | Miller et al. | |
| 3,982,307 | 9/1976 | Smith et al. | |
| 4,536,924 | 8/1985 | Willoughby | 24/545 |
| 4,706,347 | 11/1987 | Lindsay | 223/96 |
| 4,763,390 | 8/1988 | Rooz | 223/93 |
| 4,884,726 | 12/1989 | Kolton et al. | 223/91 |

FOREIGN PATENT DOCUMENTS

| | | |
|---|---|---|
| 28380 | 7/1989 | Australia . |
| 0095353 | 11/1983 | European Pat. Off. . |
| 8101361 | 11/1979 | PCT Int'l Appl. . |
| 8707127 | 5/1987 | PCT Int'l Appl. . |
| 1162788 | 8/1969 | United Kingdom . |
| 1297575 | 11/1972 | United Kingdom . |
| 2044096 | 10/1980 | United Kingdom ............. 223/96 |

OTHER PUBLICATIONS

WO8707127, May 1987, PCT Application, Meloby et al.
WO8101361, Nov. 1979, PCT Application, Land.
EP0095353, Nov. 1983 EPO Application, Duester et al.

Primary Examiner—Clifford D. Crowder
Assistant Examiner—Bibhu Mohanty
Attorney, Agent, or Firm—Scully, Scott, Murphy & Presser

[57] ABSTRACT

Disclosed is a garment hanger and a moulded plastic clip that comprises a front leg and a rear leg joined in a spaced relation by an integrally moulded resilient leaf, each leg having object engaging free ends, a portion overlying said leaf and formed with teeth for engagement with a pawl extending inwardly and outwardly from the front leg to provide a ratchet, said leaf having an elastic memory such that said legs are spaced apart in a predetermined neutral position when said ratchet is released.

11 Claims, 2 Drawing Sheets

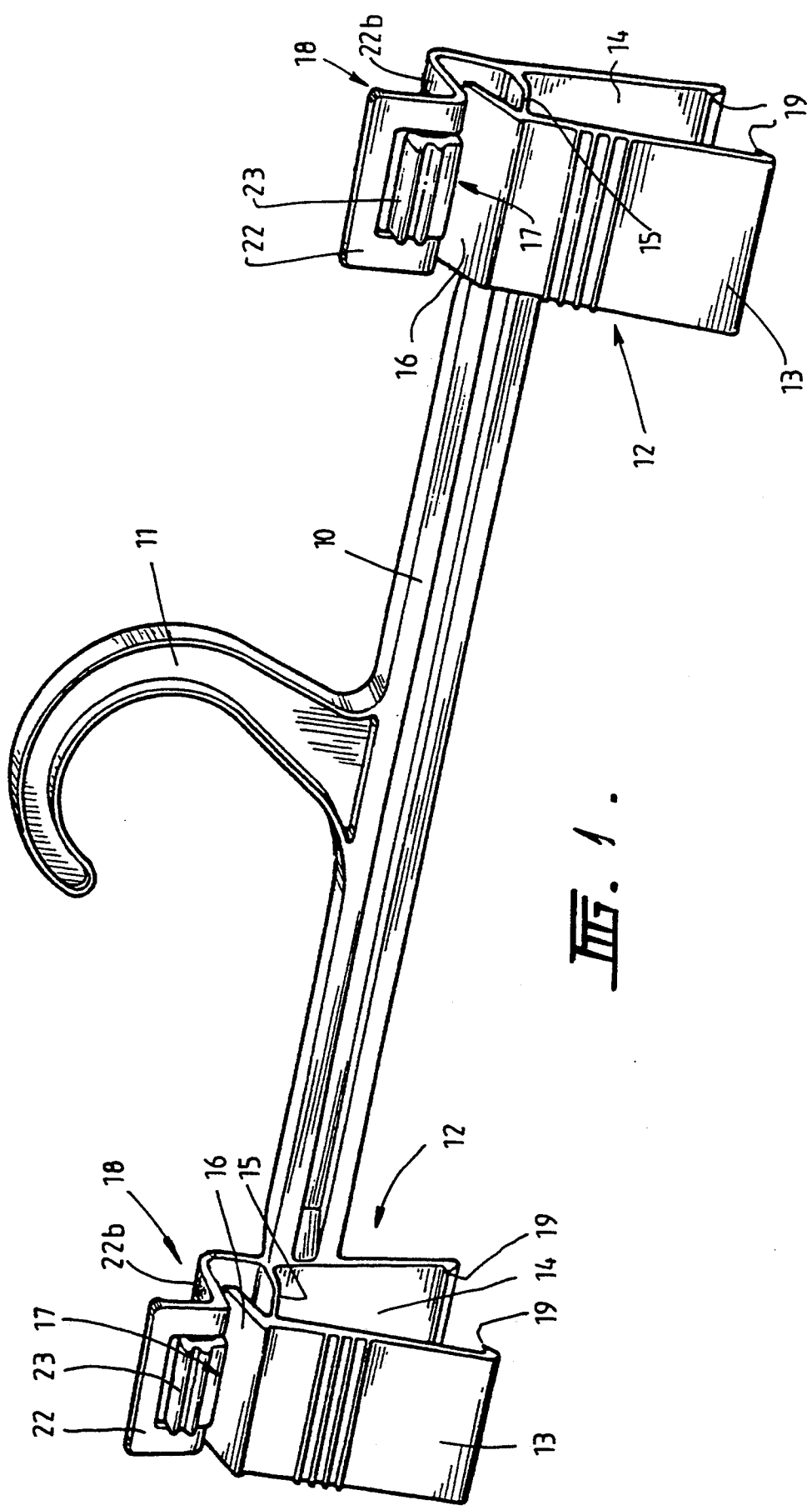

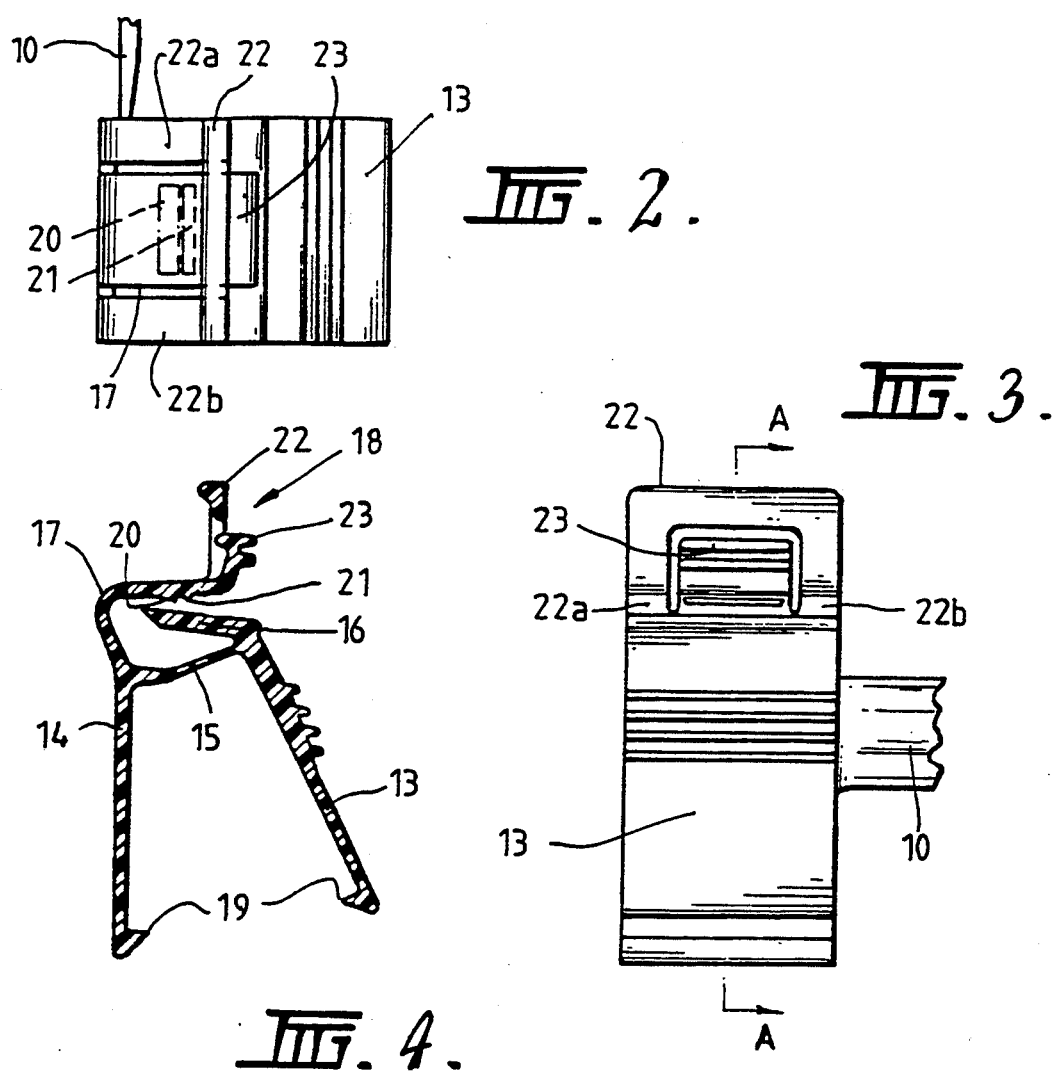
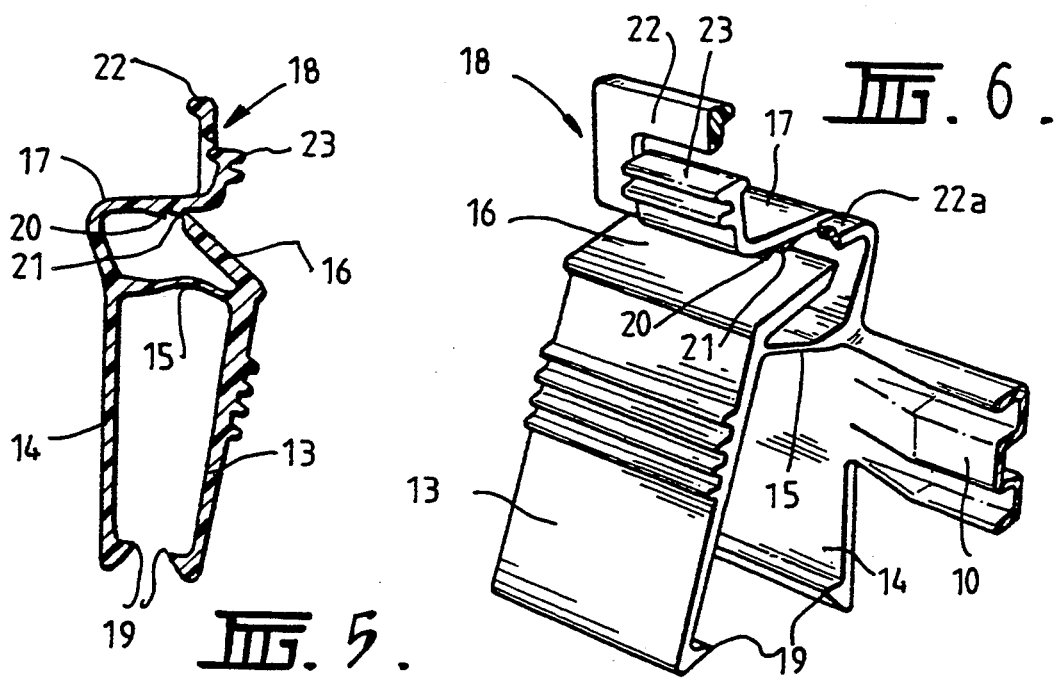

GARMENT HANGER AND CLIP

This is a continuation of copending application Ser. No. 836,150 filed on Feb. 13, 1992, now abandoned which is a continuation of Ser. No. 561,064 filed Aug. 1, 1990, now abandoned.

FIELD OF THE INVENTION

This invention relates to clips, and more particularly to an improved clip which may be integrally moulded from a suitable plastic material such that it may form part of a plastic article such as a garment hanger. However, the clip according to the invention is not limited to use on garment hangers since it may be equally useful in other fields to provide a gripping function for many different forms of articles.

BACKGROUND OF THE INVENTION

Most clips used in the garment hanger industry comprise at least two components:

the clip elements, which may be integrally moulded or separately hinged, and a spring biasing element, which may be metal element or a plastics element, which physically engages the clip elements to hold them in a closed gripping position.

The need to manufacture and assemble several components significantly adds to the cost of the hanger and reduces its reliability in the market place.

In addition to the above, when articles such as garment hangers having clips according to the prior art are loaded with garments and are then stacked for transport, the weight of the garments and the hangers bearing on each other may often cause undesired opening of the clips whereby the garments are released from their hangers.

SUMMARY OF THE INVENTION AND OBJECTS

It is accordingly an object of the present invention to provide an improved clip which may be integrally moulded from plastic materials, in a condition ready for use, and which is suitable for integral moulding as part of a garment clip hanger.

It is another object to provide a clip constructed in such a manner as to avoid inadvertent opening in the above manner.

The invention therefore provides a moulded plastic clip comprising a pair of legs having object engaging free end portions, an integrally moulded flexible hinge member interconnecting said legs at a position remote from said free end portions, and integrally moulded latching means capable of being engaged to hold said legs in one or more closed positions in which the free end portions of said legs are adjacent to each other or in contact with each other so as to grip an object between said free end portions.

By providing a clip in which not only the hinge is integrally moulded but also the latching means is integrally moulded, a moulded plastics article, such as a garment hanger, may be integrally moulded with one or more clips which are operational when moulded, without any additional machine or manual assembly. In this way, the overall cost of the article is considerably reduced, and the clips do not have detachable spring components which may be detached or lost when in use.

In one preferred form of the invention, said latching means comprises a fixed portion directly or indirectly integrally connected to one of said legs, a manually deformable portion providing releasable latching engagement with the other leg or with an element integrally connected to said other leg, said fixed and manually deformable portions being arranged such that relative movement between said portions is required to release said latch.

By forming the latching means in the above defined manner, the clip is still able to be conveniently released using one hand, but the possibility of inadvertent or undesirable releasing of the clip is substantially reduced. Since the clip according to the above preferred embodiment requires two forces to be applied to it in opposite directions, so as to cause relative movement between the latching components, the clips are less likely to be released by stacking forces and the like, which are necessarily in a single direction.

Clips according to the present invention may be moulded from general purpose polystyrene and thus do not require the use of exotic or expensive plastics materials which would significantly erode any cost benefits of the integral constructions.

BRIEF DESCRIPTION OF THE DRAWINGS

One presently preferred embodiment of the invention, as applied to a garment hanger, will now be described with reference to the accompanying drawings in which:

FIG. 1 is a perspective front view of a garment hanger embodying to the invention, FIG. 2 is a plan view of one end of the hanger according to FIG. 1, FIG. 3 is a front elevation of one end of the hanger of FIG. 1, FIG. 4 is a section on the line A—A of FIG. 3, FIG. 5 is an end view of the hanger of FIG. 1, with cross-bar and hook omitted, and FIG. 6 is a fragmentary perspective view of one end of the hanger of FIG. 1.

DESCRIPTION OF THE PREFERRED EMBODIMENT

Referring firstly to FIG. 1, the hanger comprises a cross-bar 10, a hook 11 and a pair of clips 12 disposed at the ends of the cross-bar 10. The hanger is moulded as a single unit from general purpose polystyrene by means of a one-off moulding operation. The hook 11 maintains the hanger in a position in use so that the cross-bar 10 extends generally horizontally. The cross-bar 10 is of a cross-sectional shape having sufficient strength to resist, twisting or bending.

Each clip 12 comprises a front leg 13 and a rear leg 14 joined by an integrally moulded flexible leaf 15 arranged towards the upper ends of the legs and having a generally horizontal orientation. The front leg 13 is extended in a rearward direction above the point of connection with the leaf 15 to form a pawl 16. The upper end of the rear leg 14 extends in forward direction above the point of connections with the leaf 15 to provide a ratchet 17 and a finger and thumb operated latch member 18. The clip has a substantially H-shaped configuration as seen in FIG. 5. The H-shaped configuration has two longer leg portions joined by a horizontally transverse portion to form four smaller leg portions which are not joined at their outer ends.

The lower end of each leg is provided with a pair of inwardly directed sharp teeth 19 which extend across the width of each leg to provide a grip for gripping a variety of different garment types which may be engaged by the clips 12 on the hanger. The opposed teeth 19 define a jaw of the respective clips 12 and the jaws are moved towards a closed position by forcing the opposed legs 13 and 14 towards each other to a position as shown in FIG. 5. Squeezing the legs together once a garment is inserted between the jaws causes the ratchet 17 and pawl 16 to co-operate whereby the jaws are held in a first position on the ratchet 17 or a second more secure position as shown in FIG. 5. The first position is achieved when the pawl 16 engages the first step 20 of the ratchet 17 whereas the second position is achieved when the pawl 16 engages the second step 21 by the application of a greater force to the legs 13 and 14.

The latch member 18 is formed as an extension of the rear leg 14 and comprises an upwardly extending portion arranged beyond the ratchet 17. Each latch member 18 comprises an outer perimeter portion 22 which encloses a movable member 23 and is supported by arms 22a, 22b extending forwardly from the top of leg 14 on either side of the ratchet 17 (FIGS. 2 and 6). The movable member 23 contains the ratchet 17 on the underside thereof. In operation the perimeter portion 22 and the movable member 23 are gripped between a finger and thumb of the user and squeezed in order to release the pawl 16 from the ratchet 17. The movable member 23 is operated by the thumb of the user whereby slight pressure causes the ratchet 17 to move to a slightly raised position to release the pawl 16 from the first step 20 or second step 21 so that the clip 12 reverts to the position shown in FIG. 4.

It should be appreciated that the flexible leaf 15 performs two essential functions, namely:

a) hinging of the front and back legs to allow the legs to be squeezed together;

b) providing a high tensile resistance force within the mechanical arrangement whereby the legs return to a predetermined neutral position as shown in FIG. 4, when the ratchet and pawl mechanism is disengaged.

The ratchet and pawl mechanism is stiff enough during its arc of travel, to compensate for spring back or relaxation of the clip legs 13 and 14 after squeezing against a garment. This results in a small loss of the original pressure which the legs exert on the garment, but such loss is sufficiently small to ensure continued grip on the garment after the clipping action has been performed. The combination of overall flexibility and springiness of the legs 13 and 14 accommodate a wide variation of garment thickness and texture, while retaining adequate gripping pressure. The additional ratchet position extends this variation even further and it is possible that more than two ratchet positions could be included in the clips 12.

In order to release a garment from the clips, it is merely necessary for a user to provide thumb pressure on the member 23 while placing a finger behind the perimeter portion 22, in which case the pawl and ratchet is disengaged. This is a simple operation which can be readily performed by the user with one hand using considerably less force than required to release a thick garment from a know a known spring clip. By using mechanical advantage, the protective surround or perimeter portion 22 overrides the grip force on the clip legs and ejects the front leg pawl 16 from the rear leg ratchet 17. The clip then springs to the normal open and ready position as shown in FIG. 4. Under normal use the clip may be operated fully between the extent of its travel without incurring damage.

Furthermore, since the member 23 must be pushed relative to the perimeter portion 22, the likelihood of undesired or inadvertent opening of the clip in use is substantially reduced since forces applied to the clip during stacking of garments supported by the hanger will be in a single direction which does not cause relative movement between the member 23 and the portion 22.

It should be evident to persons skilled in the art that the dual clip hanger employs a unique and simple configuration of several mechanical features in a way such as to satisfy a wide range of multifunction requirements. The invention thus provides a much improved garment hanger of the clip-type which may be moulded in plastics material which may be clear or may be coloured so as to be aesthetically appealing. Of course modifications to the above described embodiment may be readily envisaged by persons skilled in the art. As mentioned, the pawl and ratchet arrangement may incorporate additional steps to provide a wider variation in travel between the open and closed positions of the clip 12. Of course the various strengthening ribs which are disclosed in the drawings and not specifically mentioned herein may be varied according to different applications of the hanger to provide strength in the areas needed.

It will be further evident that the invention provides a single piece moulded article ready for immediate use and free of any post moulding operations or the addition of any other components. The hanger provides a strong self adjusting grip for a variety of garment thicknesses and textures. It is a simple and gentle action to release the mechanically advantaged clip in order to release a garment from the hanger. The hanger provides strength and durability during normal use and has a fail safe release mechanism during bulk storage or transport of garments. The operation of the clip is a self-evident operation for ready consumer acceptance.

As mentioned above, the clip embodying the invention, forming part of the hanger described above, may be used for many different purposes outside the garment hanger industry. Thus, the invention is not in any way restricted to the use of the clip according to the invention on garment hangers.

The entire contents of the provisional specification lodged with Australian Patent Application of which this is the complete specification is hereby imported into this specification and forms part of the disclosure of this specification. The claims form part of the disclosure of this specification.

I claim:

1. An integral plastic clip molded in a substantially H-shaped configuration, said clip comprising a pair of legs, each leg having an object engaging free end portion and an integral connecting portion, each of said legs integrally connected in spaced relation at said connecting portion by a leaf portion having an elastic memory, said connecting portion substantially perpendicular to each leg to form said substantially H-shaped configuration, said leaf portion having a transverse dimension which places the free end portions of the legs in a widely spaced apart relationship when said clip is open, said clip having an integral latching means molded above said leaf portion with at least one portion of said latching means substantially parallel to said leaf portion which is capable of engagement to hold said legs in at least one closed position in which said free end portions of said legs are positioned adjacent each other so as to grip an object between said free end portions, said legs further having a predetermined open position in which the free end portions of the legs are spaced apart and face toward each other and define an article receiving opening to receive an article to be gripped by the free end portions of the legs, whereby said leaf portion is in a deformed state when said legs are held in said closed position, said leaf portion operating as a restoring spring to move said free end portions apart and to hold said free end portions in said predetermined spaced apart open position when said latching means is released so that an object may be readily inserted between said free end portions for gripping.

2. The clip of claim 1, wherein said latching means comprises a fixed portion integrally connected to one of said legs, a manually deformable portion providing releasably latching engagement with said fixed portion, said fixed and manually deformable portions being arranged such that relative movement between said portions is required to release said latch.

3. An integral plastic clip molded in a substantially H-shaped configuration, said clip comprising a pair of legs, each leg having an object engaging free end portion and an integral connecting portion, said legs further having a predetermined open position in which the free end portions of the legs are spaced apart and face toward each other and define an article receiving opening to receive an article to be gripped by the free end portions of the legs, each of said legs integrally connected in spaced relation at said connecting portion by a thin leaf of plastic defining a hinge means, said connecting portion substantially perpendicular to each leg to form said substantially H-shaped configuration, said hinge means constructed to allow said free end portions to move toward a closed position thereby deforming said hinge means in a manner so that said hinge means operates as a restoring spring to move said legs apart to, and to hold said free end portions in, said predetermined open position when released, said leaf of plastic having a transverse dimension which places the free end portions of the legs in a widely spaced apart relationship when said clip is open; said clip having a latching means molded above said leaf of plastic with at least one portion of said latching means substantially parallel to said leaf of plastic which is capable of engagement to hold said legs in at least one closed position and a reaction means adjacent said latching means, said reaction means being positioned to enable said reaction means and said latching means to be manually engaged and to enable said latching means to be manually released.

4. An integral plastic clip molded in a substantially H-shaped configuration, said clip comprising a pair of legs, each leg having an object engaging free end portion and an integral connecting portion, said legs further having a predetermined open position in which the free end portions of the legs are spaced apart and face toward each other and define an article receiving opening to receive an article to be gripped by the free end portions of the legs, each of said legs integrally connected in spaced relation at said connecting portion by a thin leaf of plastic defining a hinge means constructed to allow said free end portions to move towards a closed position thereby deforming said hinge means in a manner so that said hinge means operates as a restoring spring to move said legs apart to, and to hold said free end portions in, said predetermined open position when released; ratchet means extending from said connecting portion of one leg into generally overlying and parallel relationship with said thin leaf; pawl means extending upwardly and inwardly towards said overlying and parallel ratchet means and having a length selected to engage said ratchet means when said legs are moved to said closed position to hold said legs in said closed position; guard means at least partly surrounding said ratchet means, said ratchet means being manually movable relative to said guard means to release said pawl from said ratchet means.

5. The clip of claim 4, wherein said guard means is carried by arms extending to said connecting end portion of said one of said legs, said arms being disposed on either side of said ratchet, said guard means further having a perimeter portion partly surrounding a free end of said ratchet means such that when pressure is applied to said free end while simultaneously using the perimeter portion to apply a reaction force, said pawl is released from said ratchet means.

6. The clip of claim 4 or 5, wherein said ratchet means has at least two spaced ribs against which said pawl is able to engage to hold said legs in two alternative closed positions.

7. A hanger for garments comprising a hook, a cross bar extending from either side of said hook and a clip means mounted on or formed integrally with said cross bar adjacent either end thereof, said clip means being an integral plastic clip molded in a substantially H-shaped configuration, said clip comprising a pair of legs, each leg having an object engaging free end portion and an integral connecting portion, each of said legs integrally connected in spaced relation at said connecting portion by a leaf portion having an elastic memory, said clip having latching means molded above said leaf portion which is capable of engagement to hold said legs in at least one closed position in which said free end portions of said legs are positioned adjacent each other so as to grip an object between said free end portions, said legs further having a predetermined open position in which the free end portions of the legs are spaced apart and face toward each other and define an article receiving opening to receive an article to be gripped by the free end portions of the legs, whereby said leaf portion is in a deformed state when said legs are held in said closed position, said leaf portion operating as a restoring spring to move said free end portions apart and to hold said free end portions in said predetermined spaced apart open position when said latching means is released so that an object may be readily inserted between said free end portions of gripping.

8. The hanger of claim 7, wherein said latching means comprises a fixed portion integrally connected to one of said legs, a manually deformable portion providing releasable latching engagement with said fixed portion, said fixed and manually deformable portions being arranged such that relative movement between said portions is required to release said latch.

9. A hanger molded in a single piece from plastics material, said hanger having at least one integral plastic clip molded in a substantially H-shaped configuration, said clip comprising a pair of leg members, each leg member having a first and second end, and providing at respective first ends jaws for gripping a garment, said legs further having a predetermined open position in which the first ends of the legs are spaced apart and face toward each other and define an article receiving opening to receive an article to be gripped by the first ends of the legs, said leg members being joined by an integrally molded resilient leaf constructed to allow said jaws to be moved towards each other to a gripping position whereby said leaf is in a deformed state when said jaws are in said gripping position and to cause said jaws to spring apart to and to hold said first ends of the legs in said predetermined open position when released from said gripping position, said leg members being formed at second ends with a ratchet and pawl mechanism for holding said jaws in said gripping position and facilitating ready release to said open position.

10. The clip as recited in claim 1 wherein said latching means is capable of engagement to hold said legs in a plurality of closed positions.

11. The clip as recited in claim 3 wherein said latching means is capable of engagement to hold said legs in a plurality of closed positions.

* * * * *